United States Patent
Lin et al.

(10) Patent No.: US 7,949,443 B2
(45) Date of Patent: May 24, 2011

(54) ELECTRIC-VEHICLE DRIVING APPARATUS

(75) Inventors: Min Lin, Fuchu (JP); Manabu Matsuoka, Tachikawa (JP); Akira Miyazaki, Kunitachi (JP); Kazuaki Yuuki, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/876,838

(22) Filed: Sep. 7, 2010

(65) Prior Publication Data

US 2010/0332065 A1 Dec. 30, 2010

Related U.S. Application Data

(63) Continuation of application No. PCT/JP2009/053986, filed on Mar. 3, 2009.

(30) Foreign Application Priority Data

Mar. 7, 2008 (JP) ................... 2008-058459

(51) Int. Cl.
*G05D 3/00* (2006.01)
(52) U.S. Cl. ........................................................ 701/22
(58) Field of Classification Search .................. 701/22, 701/47, 48; 318/370, 375, 381, 441, 723, 318/757, 762
See application file for complete search history.

(56) References Cited

U.S. PATENT DOCUMENTS

2008/0012513 A1* 1/2008 Poyhonen et al. ............ 318/376

FOREIGN PATENT DOCUMENTS

| JP | 61-170203 | 7/1986 |
|---|---|---|
| JP | 6-90593 | 3/1994 |
| JP | 9-140165 | 5/1997 |
| JP | 2001-204101 | 7/2001 |
| JP | 2005-33885 | 2/2005 |
| JP | 2006-67638 | 3/2006 |

OTHER PUBLICATIONS

International Preliminary Examination Search Report issued Oct. 21, 2010, in PCT/JP2009/053986, filed Mar. 3, 2009.

* cited by examiner

*Primary Examiner* — Kim T Nguyen
(74) *Attorney, Agent, or Firm* — Oblon, Spivak, McClelland, Maier & Neustadt, L.L.P.

(57) ABSTRACT

According to one embodiment, there is provided an electric-vehicle driving apparatus which consumes regenerative energy by a brake resistor and can decrease harmonic components generated by a brake-chopper switching circuit. Plural brake-chopper switching circuits are provided in parallel for each inverter. Harmonic components generated by the brake-chopper switching circuits are decreased by changing phases or frequencies of triangular carrier waves of the switching circuits, relatively to each other.

6 Claims, 15 Drawing Sheets

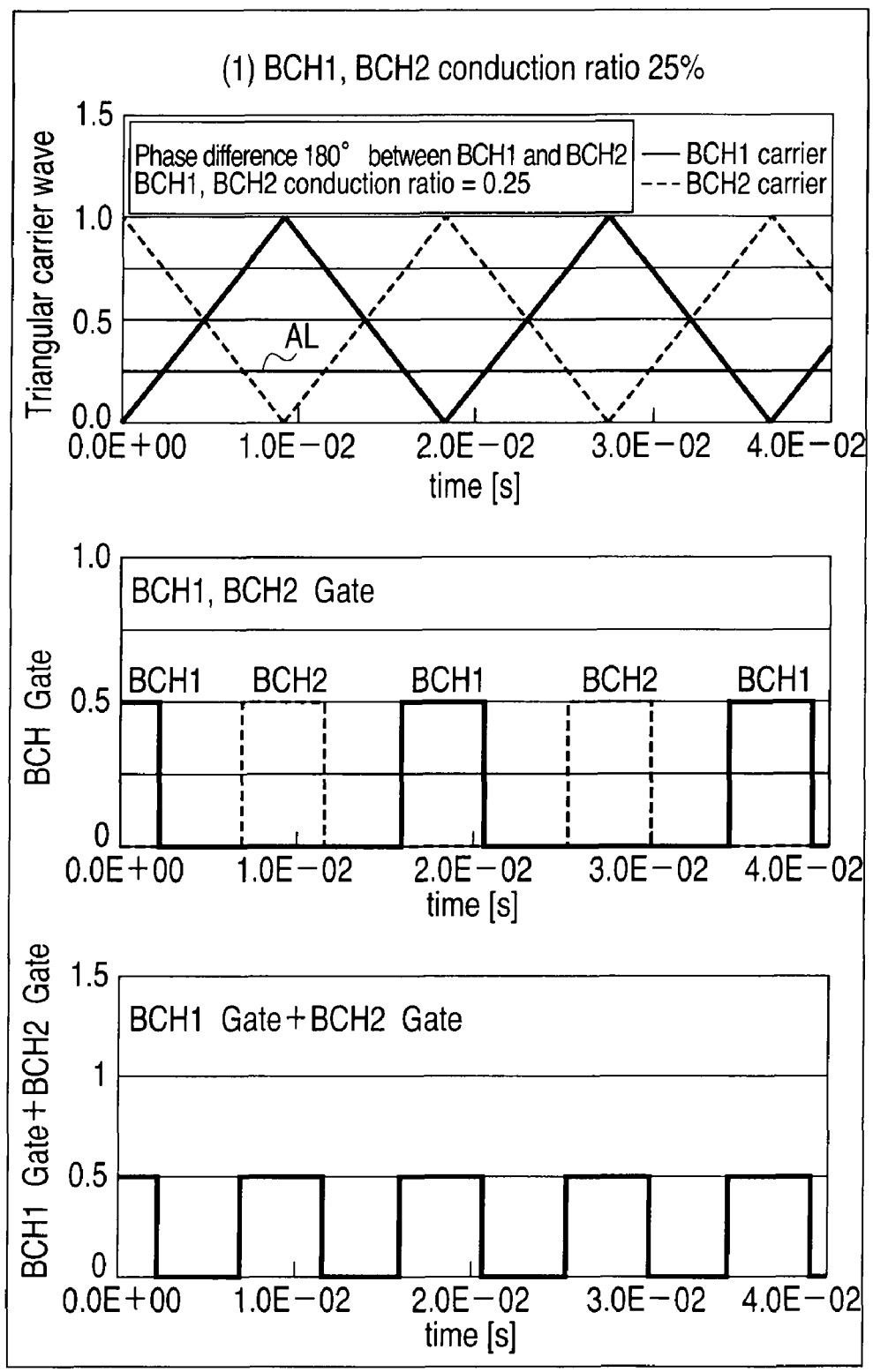
F I G. 3A

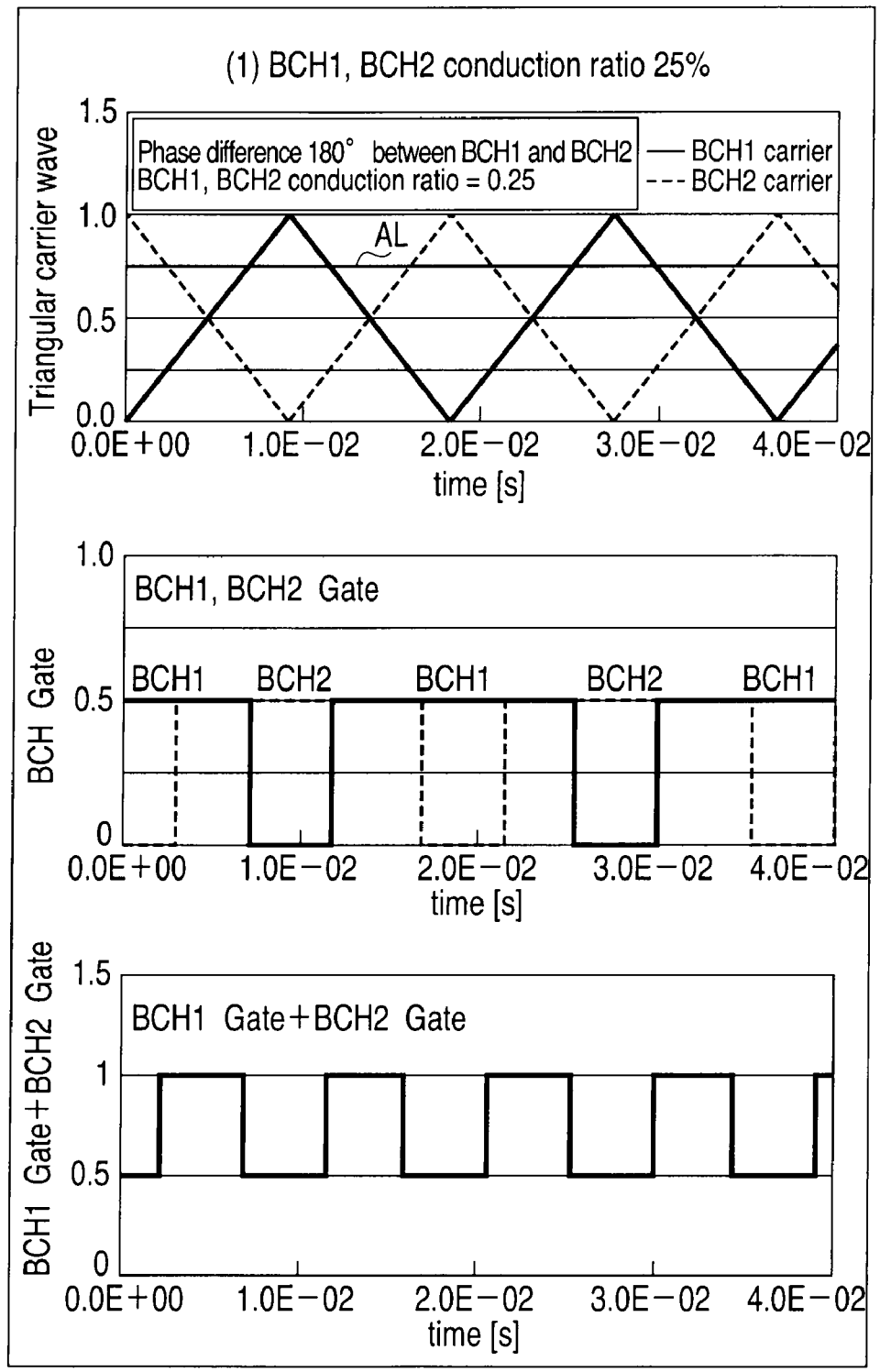
F I G. 3C

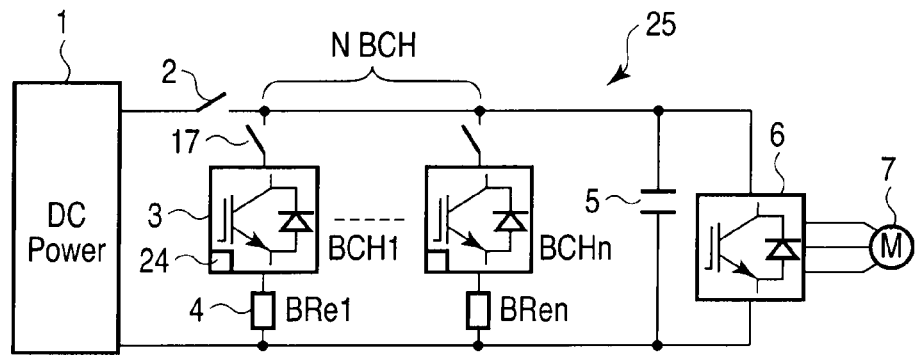
F I G. 9
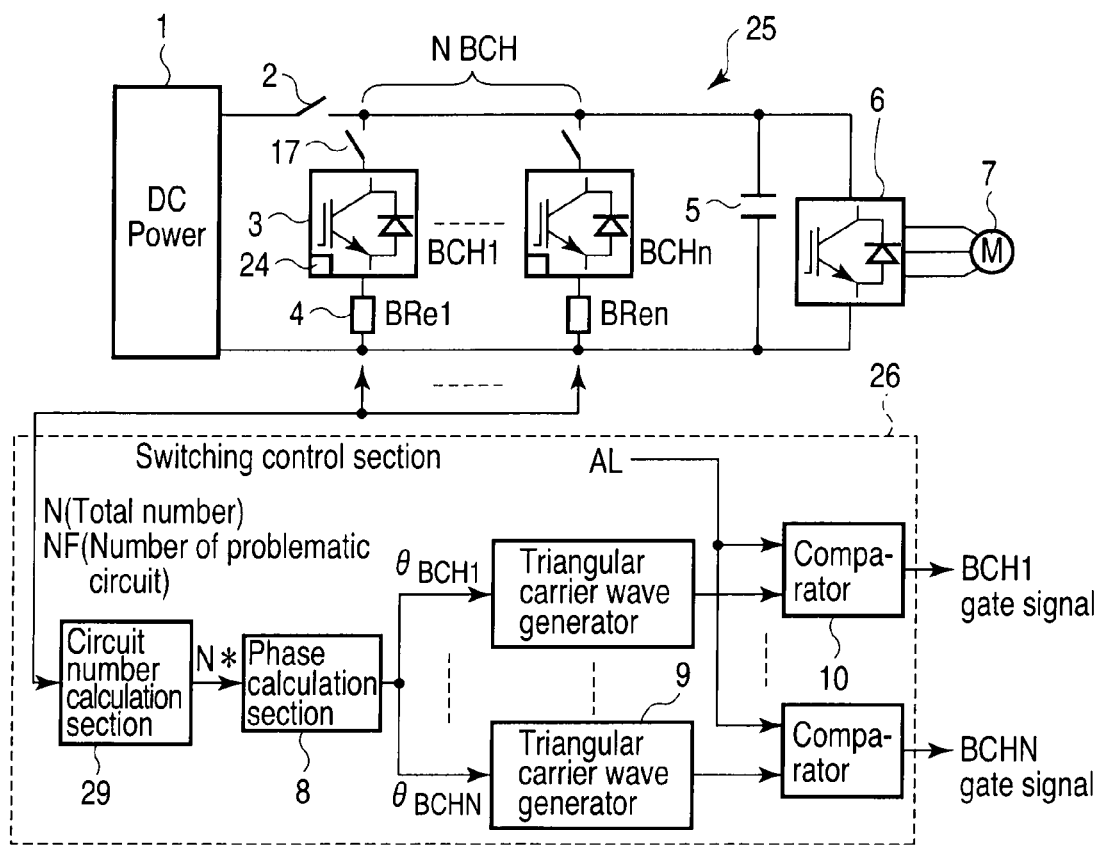
F I G. 10

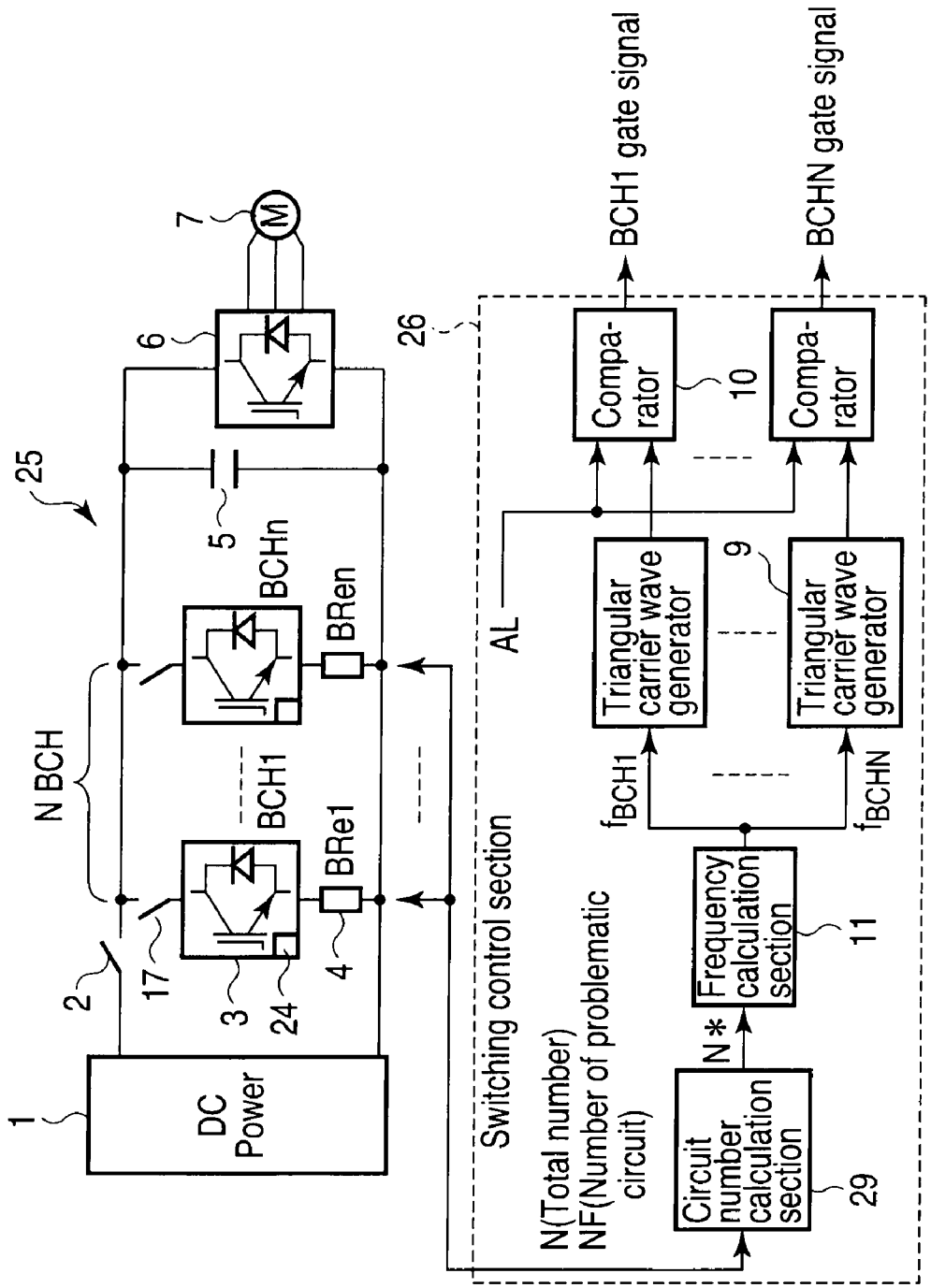
F I G. 11

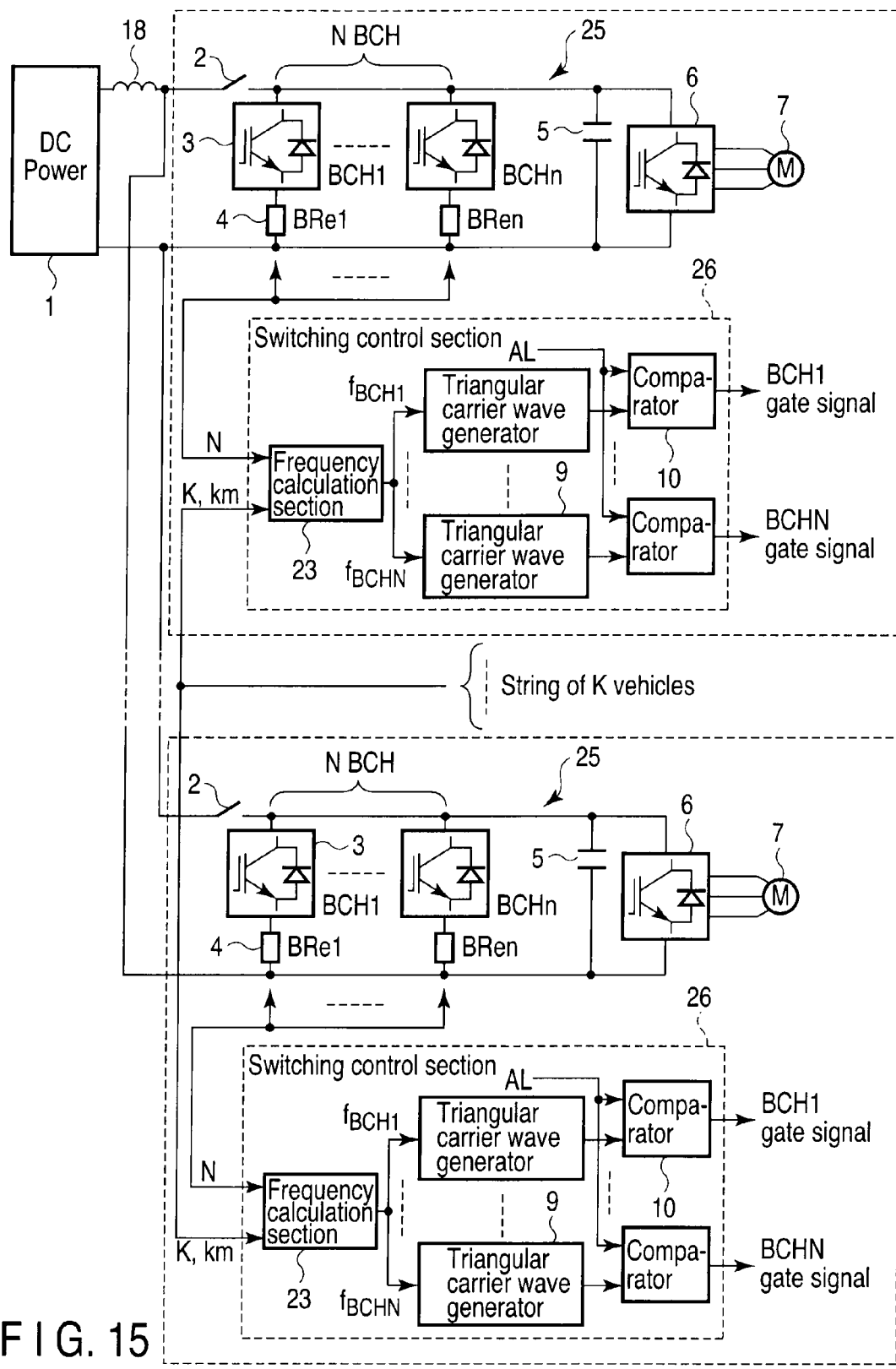
F I G. 15

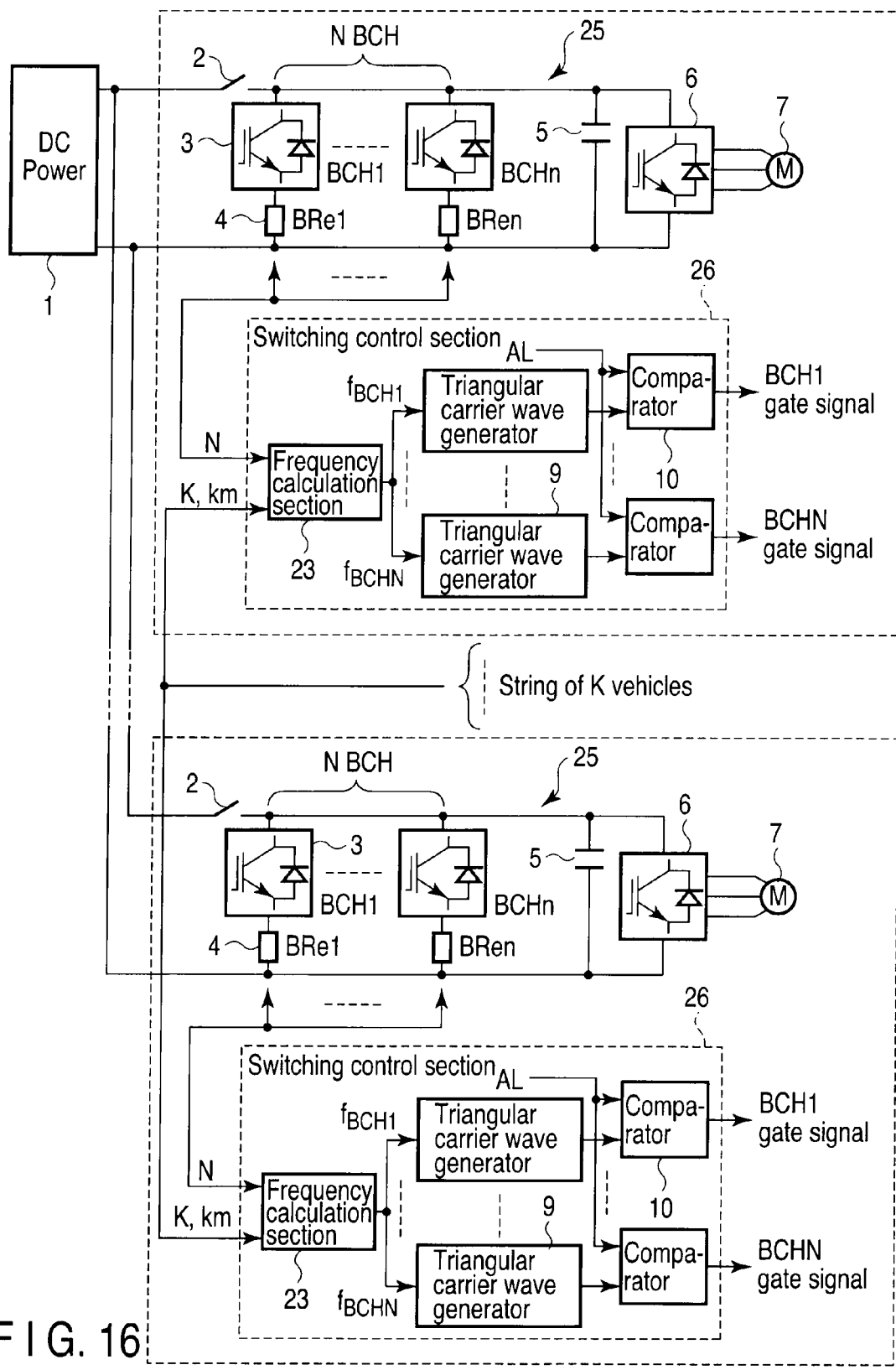
F I G. 16 though the switching frequency fBCH of the brake-chopper switching circuit is constant, a frequency of ripples generated by an inverter varies in proportion to a vehicle speed. Accordingly, a harmonic component of a particular frequency fBCH and a harmonic component, which is generated by superposing with a harmonic component generated from an inverter, may cause inductive interference with communication channels of a power generation system.

ELECTRIC-VEHICLE DRIVING APPARATUS

CROSS REFERENCE TO RELATED APPLICATIONS

This is a Continuation Application of PCT Application No. PCT/JP2009/053986, filed Mar. 3, 2009, which was published under PCT Article 21(2) in Japanese.

This application is based upon and claims the benefit of priority from Japanese Patent Application No. 2008-058459, filed Mar. 7, 2008; the entire contents of which are incorporated herein by reference.

FIELD

Embodiments described herein relate generally to an electric-vehicle driving apparatus which consumes excessive energy generated while a regenerative brake is operating.

BACKGROUND

Driving apparatuses used in electric vehicles for railways have an operation mode called dynamic braking in which regenerative energy generated by a motor for driving wheels is consumed by brake resistance when a brake is activated. In this mode, a conduction ratio calculated on the basis of a filter capacitor voltage in a side of a direct-current voltage input of an inverter for driving the motor is compared with a brake-chopper triangular carrier wave. Based on a comparison result thereof, a gate signal for a brake-chopper switching circuit is generated thereby to control conduction conditions.

Harmonic components which are generated when such a brake-chopper switching circuit operates sometimes cause inductive interference with an electric generator system. As relevant prior art techniques to reduction of harmonic components, Jpn. Pat. Appln. KOKAI Publications No. 9-140165 and No. 2006-67638 have been disclosed. These publications both describe reduction of harmonic waves which are generated by a converter.

In a conventional vehicle system, a brake-chopper switching circuit uses a constant carrier frequency, and therefore generates harmonic components at a particular frequency. FIG. 17 shows simulation results concerning harmonic components generated by switching of a conventional brake-chopper switching circuit. A power generation system is under limitations of limit values to harmonic components for various signal systems, for example, because communications are established by using rails. A curve 100 denotes such a limitation value. A waveform 111 represents a spectrum waveform of a harmonic wave which was generated from a brake-chopper switching circuit when one inverter circuit is used. A waveform 112 represents a spectrum waveform of a harmonic wave which was generated from the brake-chopper switching circuit when a string of four engine vehicles (including eight inverter circuits) was used. In this example, the brake-chopper switching circuit has a switching frequency fBCH of 327 Hz, and a motor rotation frequency was 8.6 Hz.

At the switching frequency fBCH, a ripple 113 occurred and suggests a high-frequency component which was generated by switching the brake-chopper switching circuit. Ripples 114 and 115 respectively suggest secondary and tertiary high-frequency components which were generated from the brake-chopper switching circuit. Other ripples suggest high-frequency components which were generated by inverters. Thus, a margin of the ripple 113 of a high-frequency wave which was generated by the brake-chopper switching circuit was small (i.e., a margin value from a ripple peak to a most strict limitation value).

Although the switching frequency fBCH of the brake-chopper switching circuit is constant, a frequency of ripples generated by an inverter varies in proportion to a vehicle speed. Accordingly, a harmonic component of a particular frequency fBCH and a harmonic component, which is generated by superposing with a harmonic component generated from an inverter, may cause inductive interference with communication channels of a power generation system.

In an embodiment of the invention, plural brake-chopper switching circuits are provided in an electric-vehicle driving apparatus in which regenerative energy is consumed by a brake resistor. Harmonic components generated by the brake-chopper switching circuits are reduced by changing phases or frequencies of triangular carrier waves of the respective switching circuits. As a result, stable communications can be performed through a power generation system (rails).

BRIEF DESCRIPTION OF THE DRAWINGS

FIG. 3A represents relationships between a triangular carrier wave and a conduction ratio AL (upper graph), gate signals output from a comparator 10 (middle graph), and a composite signal of the gate signals (lower graph);

FIG. 3C represents relationships between a triangular carrier wave and still another conduction ratio AL (upper graph), gate signals output from the comparator 10 (middle graph), and a composite signal of the gate signals (lower graph);

FIG. 9 is a block diagram representing a configuration of the fourth embodiment of the invention;

FIG. 10 is a block diagram representing a configuration of the fifth embodiment of the invention;

FIG. 11 is a block diagram representing a configuration of the sixth embodiment of the invention;

FIG. 15 is a block diagram representing a configuration of the ninth embodiment of the invention;

FIG. 16 is a block diagram representing another configuration of the ninth embodiment of the invention.

DETAILED DESCRIPTION

In general, according to one embodiment, an electric-vehicle driving apparatus comprising:

an electric power converter which is connected to a DC power supply and converts a DC power into a three-phase current power at a variable frequency/voltage, to drive an AC motor;

a plurality of power-generation brake circuits each of which is connected in parallel to terminals of the electric power converter in a DC side thereof and is constituted by a serial circuit comprising a switching circuit and a resistor, to control consumption of regenerative electric power; and a switching control section which controls switching of the switching circuits by gate signals generated on the basis of comparison between carrier frequency waves generated for the respective switching circuits and a conduction ratio, wherein the switching control section generates the gate signals by shifting triangular carrier waves of the respective switching circuits.

Hereinafter, embodiments of the invention will be described with reference to the drawings.

Embodiment 1

Figure 1:
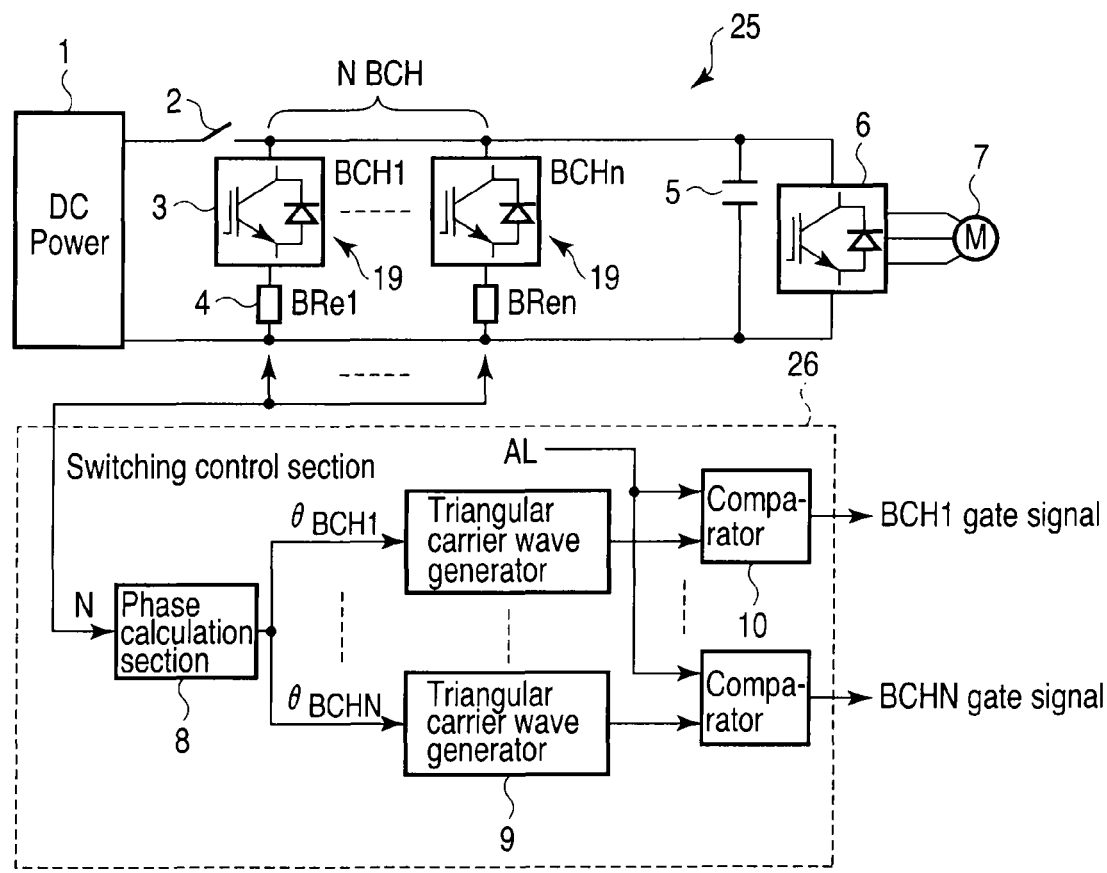
FIG. 1 is a block diagram representing a configuration of the first embodiment of the invention.

FIG. 1 is a block diagram representing a schematic configuration of the first embodiment of an electric-vehicle driving apparatus according to the invention.

A main circuit 25 will be described first. A DC power supply 1 is a combination of an engine power generator on a vehicle plus a rectifier, or an AC electric train line (aerial line) plus a converter. The DC power supply 1 is connected through a first switch 2 to plural power-generation brake circuits 19, a filter capacitor 5, and an inverter 6. The inverter 6 is connected to a motor 7 which functions as a power source for driving the electric vehicle.

For example, a total N of power-generation brake circuits 19 each are connected in parallel to two ends of the filter capacitor 5. The power-generation brake circuits 19 each are constituted as a serial circuit comprising a brake-chopper switching circuit 3 for controlling regenerative power, and a resistor 4 (hereinafter referred to as a brake resistor) for consuming electric power which is caused to flow by switching operation. Thus, in the electric-vehicle driving apparatus according to the present embodiment, each inverter is provided with plural brake-chopper switching circuits.

Next, a switching control section 26 will be described. The switching control section 26 for the brake-chopper switching circuits 3 controls conduction states (on/off) of switching elements used in the switching circuits 3. The switching control section 26 is input with the number N of the brake-chopper switching circuits.

A phase calculation section 8 provided in the switching control section 26 is input with the number N of brake-chopper switching circuits 3, and calculates triangular carrier waves of the respective brake-chopper switching circuits.

For example, the phase calculation section 8 calculates a phase θBCH of a triangular carrier wave in a manner expressed by an expression 1 below.

[Math 1]

$$\theta BCHn = \int (2*\pi*fBCH)dt + (n-1)*2\pi/N \quad (1)$$

Figure 2:
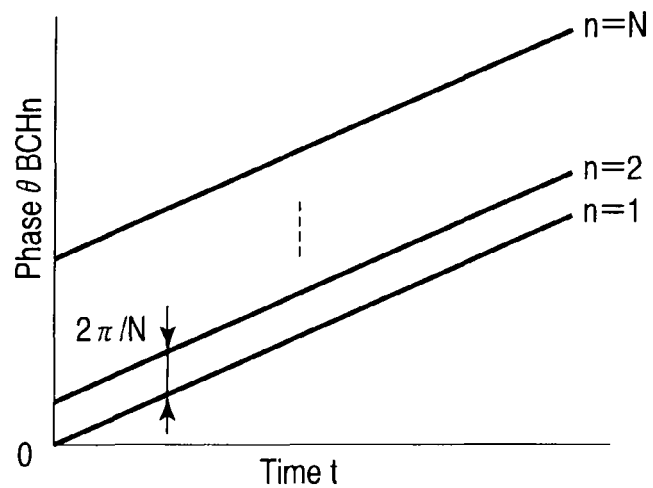
FIG. 2 is a graph representing phases θBCHn of triangular carrier waves calculated by a phase calculation section 8.

Here, fBCH expresses a triangular carrier wave frequency of the brake-chopper switching circuits 3, N expresses a number of the brake-chopper switching circuits 3 connected in parallel, and n expresses an n-th brake-chopper switching circuit (where n=1 to N). FIG. 2 is a graph representing the phases θBCHn of triangular carrier waves which are calculated by the phase calculation section 8. Each of the phases θBCHn increases in proportion to time t, and a phase difference between adjacent two phases θBCHn and θBCHn+1 is $2\pi/N$.

Outputs θBCH1 to θBCHN are input to triangular carrier wave generators 9 for the respective brake-chopper switching circuits 3. The triangular carrier wave generators 9 generate triangular carrier waves respectively for the brake-chopper switching circuits 3, in correspondence with the phases θBCHn.

Figure 3B:
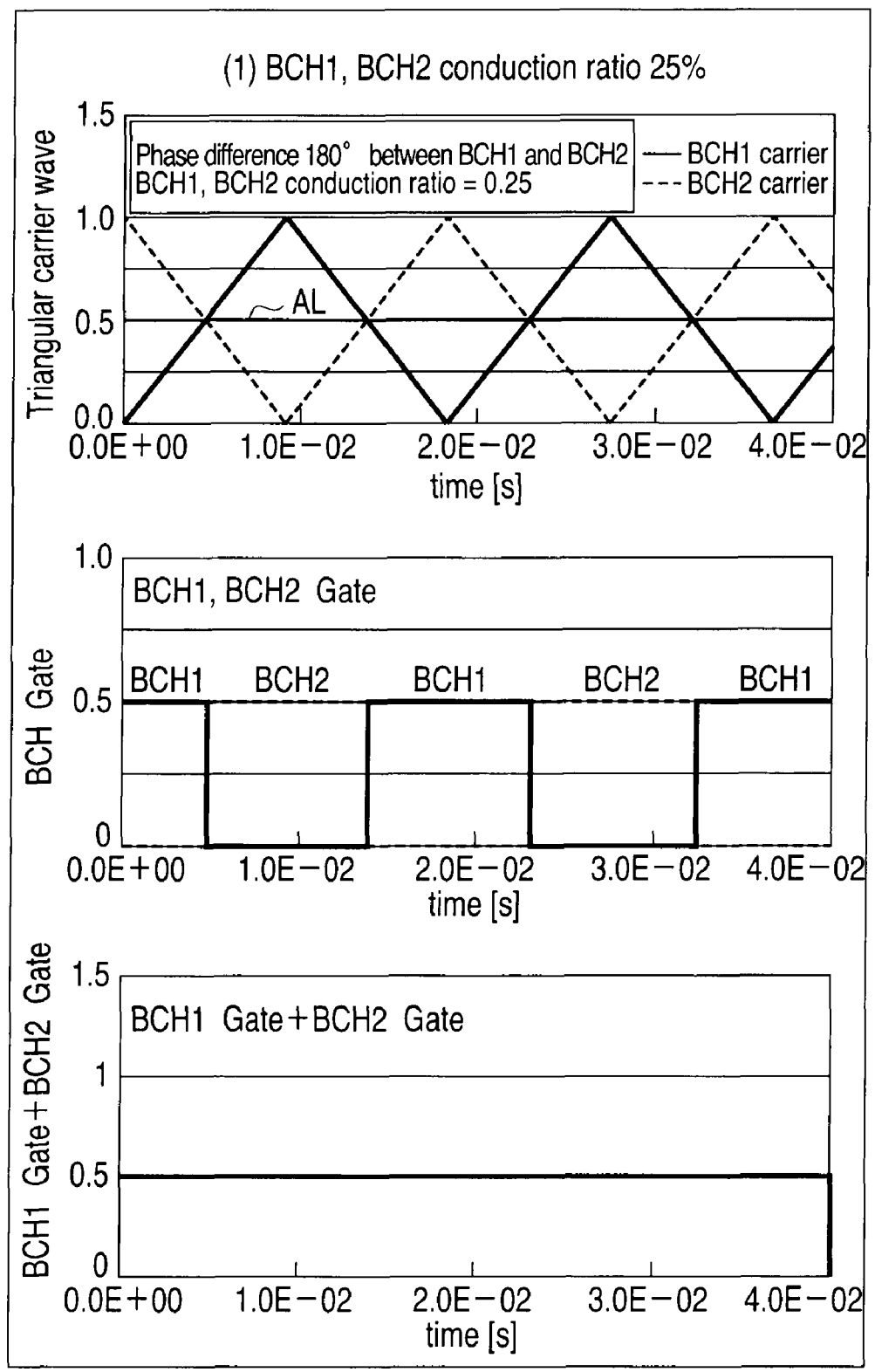
FIG. 3B represents relationships between a triangular carrier wave and another conduction ratio AL (upper graph), gate signals output from the comparator 10 (middle graph), and a composite signal of the gate signals (lower graph)

A comparator 10 is input with the output triangular carrier waves from the triangular carrier wave generators 9, and conduction ratios AL of the brake-chopper switching circuits 3 which are calculated by a momentary voltage at the filter capacitor 5. FIG. 3 represent a triangular carrier wave and a conduction ratio AL when the power-generation brake circuit 19 is constituted by two circuits (BCH1 and BCH2: upper graph), gate signals which are output from the comparator 10 (BCH1Gate and BCH2Gate: middle graph), and a composite signal of the gate signals (BCH1Gate+BCH2Gate: lower graph). The conduction ratios AL are 25% in FIG. 3A, 50% in FIG. 3B, and 75% in FIG. 3C. As represented in the upper graph of FIG. 3A, when the power-generation brake circuit 19 is constituted by two circuits, triangle waves respectively generated by the two circuits have phases shifted by 180° from each other.

When the conduction ratio AL is greater than a triangular carrier wave, the switching element of the brake-chopper switching circuit 3 turns on. When the conduction ratio AL is smaller than a triangular carrier wave, the switching element turns off. Accordingly, a demodulation control is performed on a pulse width for switching. Thus, for example, when two power-generation brake circuits 19 are provided, ripple components generated by their own brake-chopper switching circuits 3 have phases which are inverse to each other (phase difference=π), and therefore logically cancel each other.

Figure 4:
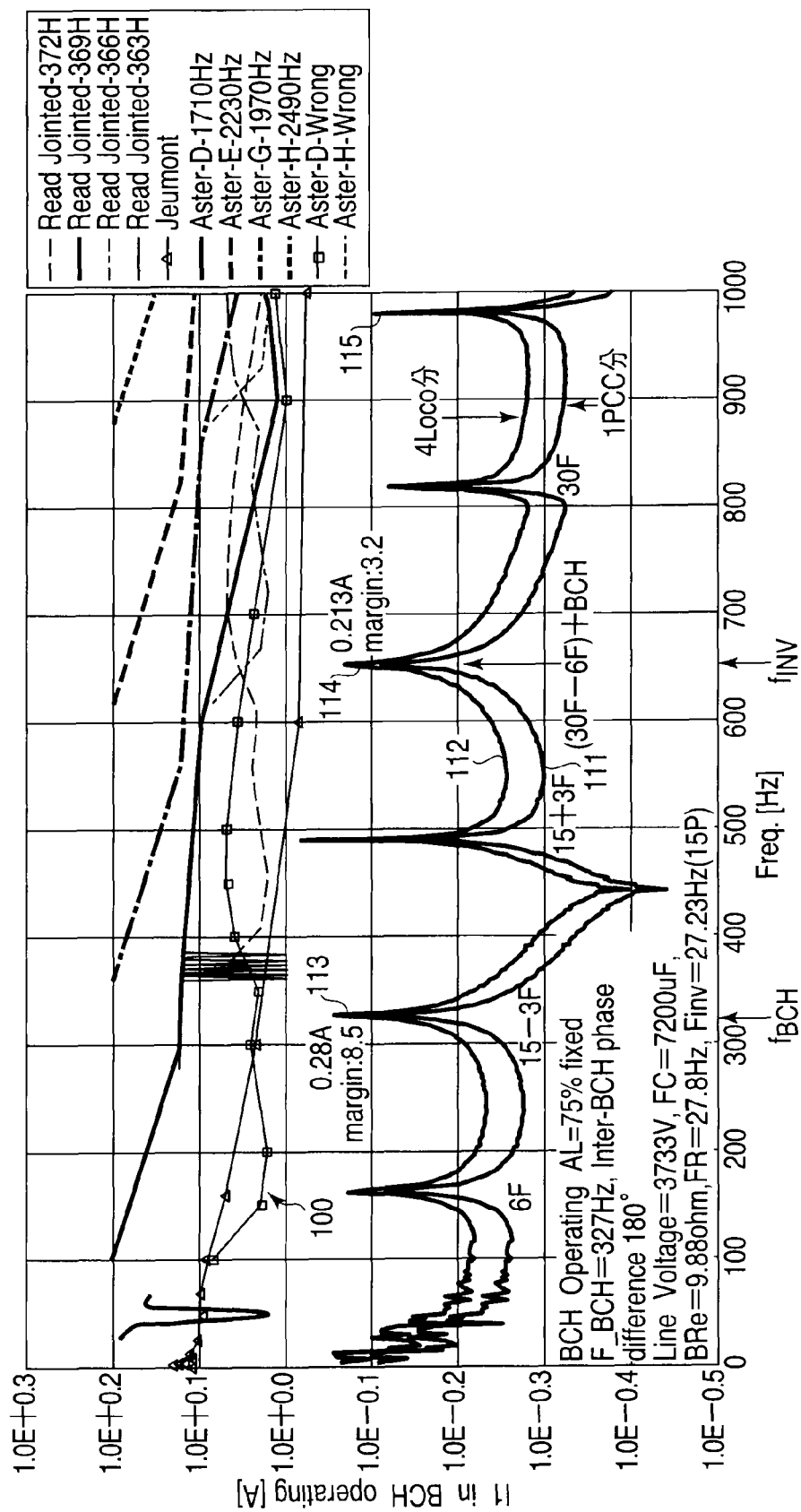
FIG. 4 is a graph showing simulation results of harmonic waves of brake-chopper switching circuits to which the first embodiment is applied.

FIG. 4 shows simulation results of harmonic waves which are generated by switching of the brake-chopper switching circuits to which the present embodiment is applied. A waveform 111 represents a harmonic spectrum waveform when one inverter is used, and a waveform 112 represents a harmonic spectrum waveform when a string of four engine vehicles (including eight inverter circuits) was used. In this example, the switching frequency fBCH of the switching circuits is 327 Hz, and a rotation frequency (FR) of motors is 27.8 Hz. Further, a harmonic component generated by the inverters is 654 Hz which is just twice the harmonic wave frequency 327 Hz generated by the brake-chopper switching circuits. In this case, conventionally, a secondary harmonic component 114 of the switching frequency fBCH and a harmonic component generated by inverters are superposed on each other to remarkably increase amplitudes of ripples, compared with inverters which operate at a different frequency.

In contrast, as is apparent from FIG. 4, amplitudes of harmonic components generated by the brake-chopper switching circuits are suppressed to low values, according to the invention. All of ripples 113, 114, and 115 have sufficient margins to a limit value.

As has been described above, according to the present embodiment, phases of triangular carrier waves for generating switching signals for the respective brake-chopper switching circuits 3 are shifted from one another, in accordance with the number of brake-chopper switching circuits 3. Therefore, amplitudes of frequency spectra of ripples of output currents from the brake-chopper switching circuits 3 could be reduced more than in conventional cases in which the power-generation brake circuit 19 was constituted by one circuit. In addition, harmonic waves which were generated by interference between harmonic components generated by the brake-chopper switching circuits 3 and by inverters could be reduced as well. Accordingly, harmonic components generated by the brake-chopper switching circuits 3 can be suppressed, and performance of the electric-vehicle driving apparatus can be improved.

Embodiment 2

Figure 5:
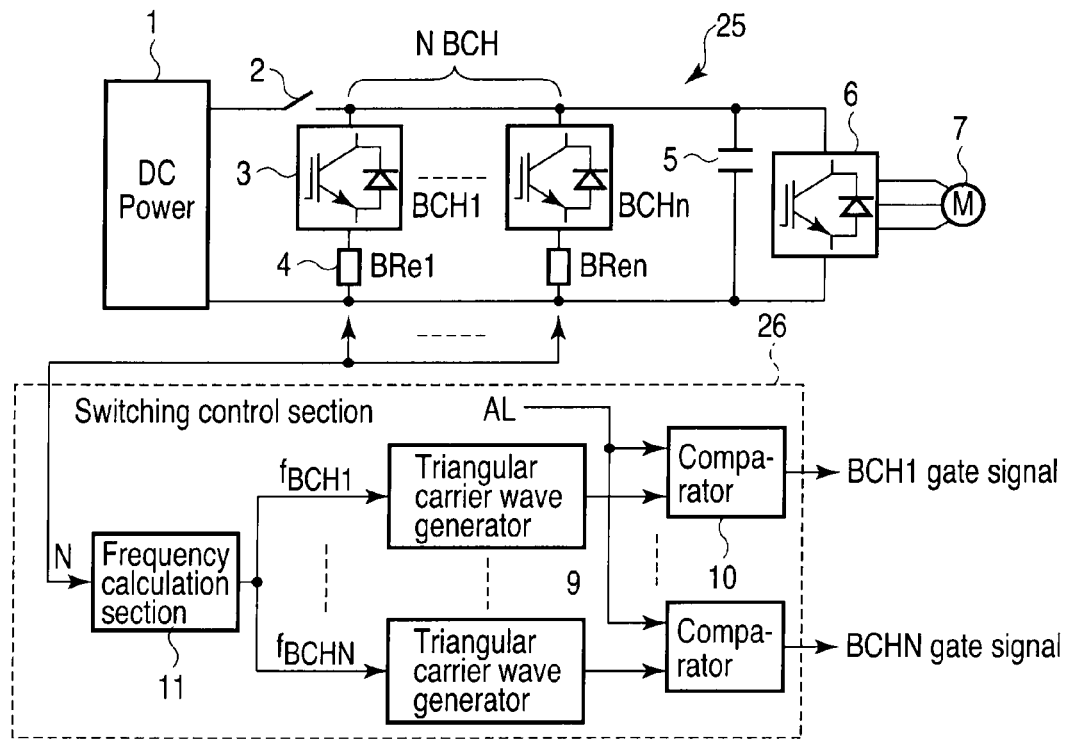
FIG. 5 is a block diagram representing a configuration of the second embodiment of the invention.

FIG. 5 is a block diagram representing a schematic configuration of the second embodiment of an electric-vehicle driving apparatus according to the invention. A main circuit 26 has the same configuration as in the first embodiment. In the second embodiment, brake-chopper switching circuits in a switching control section 26 are supplied with triangular carrier waves at different frequencies, respectively.

A frequency calculation section 11 provided in the switching control section 26 is input with a number N of brake-chopper switching circuits 3, and calculates frequencies of the triangular carrier waves for the respective brake-chopper switching circuits 3. For example, a frequency fBCH of a triangular carrier wave is determined in a manner expressed by an expression (2) below.

$$fBCHn = f0 + (n-1) * \Delta f \qquad (2)$$

In the expression, n expresses a total number n of brake-chopper switching circuits 3 (where n=1 to N). N is a number of brake-chopper switching circuits 3 connected in parallel. Therefore, triangular carrier wave frequencies fBCH to fBCHN are all different from each other, and an n-th triangular carrier wave frequency fBCH and an (n+1)-th triangular carrier wave frequency fBCHn+1 differ by f0 from each other.

Alternatively, predetermined frequencies are supplied respectively to the brake-chopper switching circuits 3.

$$\text{If } (n = 1) \quad fBCH = fBCH1 \qquad (3)$$
$$\text{If } (n = 2) \quad fBCH = fBCH2$$
$$\vdots$$
$$\text{If } (n = N) \quad fBCH = fBCHN$$

In the expression, fBCH1 to fBCHN are predetermined values.

In any of the expressions (2) and (3), the triangular carrier wave frequencies fBCH1 to fBCHN are all different from each other.

The output signals fBCH1 to fBCHN are respectively input to triangular carrier wave generators 9. In accordance with the carrier frequency fBCHn, a triangular carrier wave is generated for each of the brake-chopper switching circuit 3.

The output triangular carrier waves from the triangular carrier wave generators 9 are input to a comparator 10, and the switching elements 3 are controlled to switch on/off by comparison with a conduction ratio AL as in the first embodiment.

With the configuration as described above, the triangular carrier wave frequencies of the brake-chopper switching circuits 3 are determined depending on the number of brake-chopper switching circuits 3. Therefore, frequency spectra of ripples occurring in output currents of the brake-chopper switching circuits 3 are dispersed so that amplitudes of ripple components are decreased. Further, harmonic waves generated by interference between harmonic components generated by the brake-chopper switching circuits 3 and by inverters are decreased as well. Accordingly, harmonic components generated by the brake-chopper switching circuits 3 can be suppressed, and performance of the electric-vehicle driving apparatus can be improved.

Embodiment 3

Figure 6:
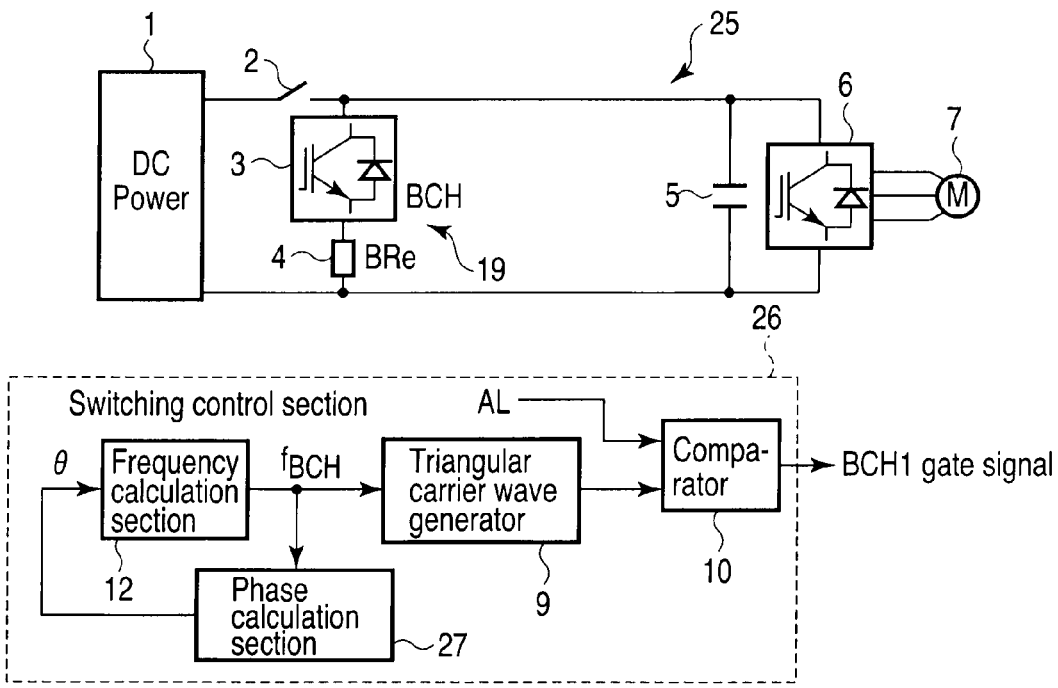
FIG. 6 is a block diagram representing a configuration of the third embodiment of the invention.

FIG. 6 is a block diagram representing a schematic configuration of the third embodiment of an electric-vehicle driving apparatus according to the invention.

A main circuit 25 is provided with one power-generation brake circuit 19 for each inverter circuit. A switching control section 26 comprises a frequency calculation section 12, a triangular carrier wave generator 9, a phase estimation section 27, and a comparator 10. The phase estimation section 27 is input with a carrier-triangle-wave frequency fBCH from the frequency calculation section 12, and calculates a phase θ (0° to 360°) on the basis of an expression (4) below.

[Math 2]

$$\theta = \int (2 * \pi * fBCH) dt \qquad (4)$$

The frequency calculation section 12 calculates a carrier frequency fBCH on the basis of the phase θ input from the phase estimation section 27. The triangular carrier wave generator 9 generates a triangular carrier wave for the brake-chopper switching circuit 3 in accordance with the triangular carrier wave frequency fBCH. The comparator 10 outputs a gate signal for the switching circuit 3 by comparison between the triangular carrier wave output from the triangular carrier wave generator 9 and a conduction ratio AL.

Figure 7:
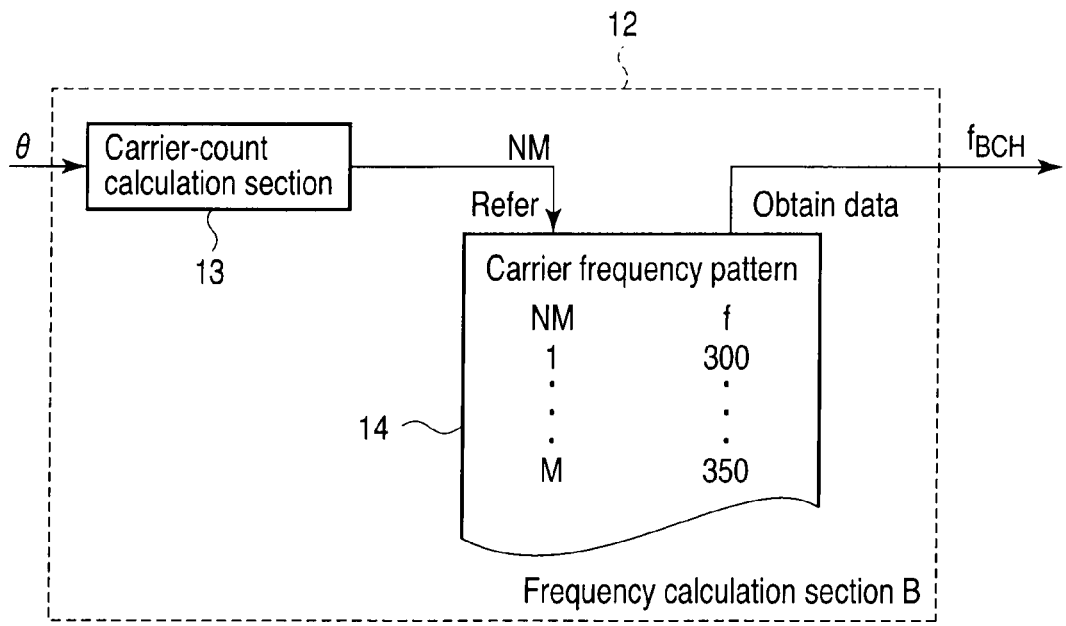
FIG. 7 is a block diagram representing a configuration of a frequency calculation section 12.

FIG. 7 is a diagram representing a configuration example of the frequency calculation section 12. A carrier-count calculation section 13 is input with a phase θ of a triangular carrier wave, counts a number of triangle waves by a counter of base-M numeral system, and outputs a triangular carrier wave count value NM.

$$NM = \text{floor}(\theta[\text{deg}]/360[\text{deg}]) \qquad (5)$$

In the expression above, "floor( )" is a function which discards decimals from the numerical value in the parenthesis.

A carrier frequency pattern table 14 prestores M carrier frequencies corresponding to the carrier-wave count value NM. The carrier wave pattern table 14 takes the carrier count value NM as an address, and outputs corresponding carrier frequency data as a carrier frequency fBCHn at the present time point. Therefore, the frequency calculation section 12 outputs a carrier frequency which cyclically changes.

That is, the phase estimation section 27 outputs a phase (0° to 360°) on the bases of each carrier frequency fBCHn supplied from the frequency calculation section 12. Based on a phase supplied from the phase estimation section 27, a carrier-count calculation section 13 in the frequency calculation section 12 counts cycles of the phase, and outputs a count value as NM. The frequency calculation section 12 outputs a carrier frequency fBCHn corresponding to the count value NM by using the carrier frequency pattern table 14.

The carrier frequency generator 9 outputs a triangular carrier wave having a cycle which differs for each wave of the triangle wave.

The brake-chopper-switching control section 26 configured as described above calculates in advance carrier frequencies fBCHn corresponding to the triangular carrier wave phase θ and values (referred to as a carrier count value in this embodiment) depending on the phase, and prestores the carrier frequencies fBCHn into a table. During operation (during braking), the table is referred to.

In the present embodiment, frequency spectra of ripples of an output current of the brake-chopper switching circuit 3 is dispersed by cyclically changing the carrier frequency (along time) into predetermined values. Therefore, harmonic components generated by the brake-chopper switching circuit 3 can be suppressed, and an electric-vehicle driving apparatus with improved performance can be provided. In addition, use of predetermined carrier frequencies facilitates reproducibility analysis for estimations, evaluations, and faults.

Figure 8:
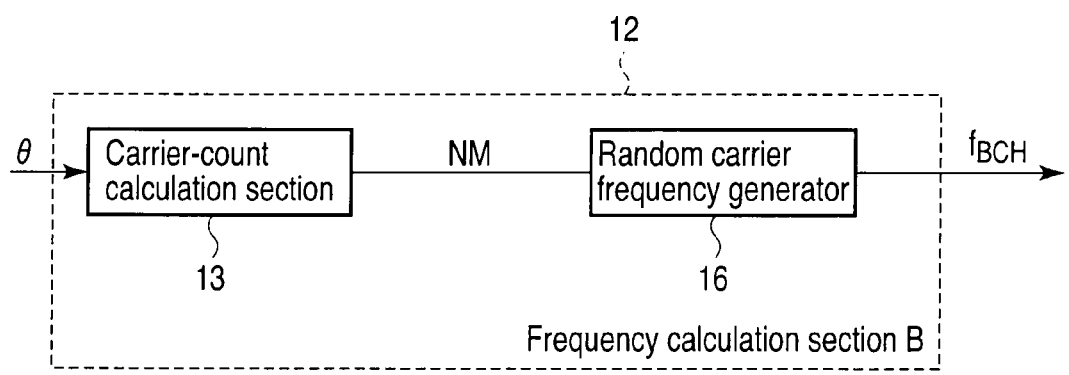
FIG. 8 is a block diagram representing another configuration of the frequency calculation section 12.

FIG. 8 is a diagram representing another configuration example of the frequency calculation section 12. This frequency calculation section 12 outputs carrier frequencies by a random method.

The carrier-count calculation section 13 is input with the phase θ of a triangular carrier wave and outputs a carrier count value NM, as described above. A random carrier frequency generator 16 generates and outputs a carrier frequency fBCHn which randomly changes without regularity, in accordance with the carrier count value NM generated by the carrier-count calculation section 13.

The brake-chopper switching circuit 3 configured as described above can uniformly disperse output current harmonic waves of the brake-chopper switching circuit 3 by randomly changing the carrier frequency. As a result, a feature of generating no particular frequency components, which is a purpose of dispersing the carrier frequency, can appear more conspicuous. Accordingly, an electric-vehicle driving apparatus with improved performance can be provided.

Embodiment 4

FIG. 9 is a block diagram representing a schematic configuration of the fourth embodiment of an electric-vehicle driving apparatus according to the invention.

An entire configuration of the present embodiment is substantially the same as that of the first embodiment. However, a main circuit 25 of the electric-vehicle driving apparatus according to the fourth embodiment is provided with an open switch 17 between each of brake-chopper switching circuits 3 and a positive electrode of a DC power supply 1. Each of the brake-chopper switching circuits 3 is provided with a fault detection section 24.

In the configuration as described above, when a fault of short-circuiting is detected by the fault detection section 24, a control section (unillustrated) of the electric-vehicle driving apparatus opens the open switch 17 connected to a corresponding brake-chopper switching circuit 3, and cuts off flow of a large current when the fault occurs. Therefore, the other properly working brake-chopper switching circuits 3 and inverter device 6 are prevented from being damaged. Accordingly, an electric-vehicle driving apparatus which ensures redundancy of the system can be provided.

Embodiment 5

FIG. 10 is a block diagram representing a schematic configuration of the fifth embodiment of an electric-vehicle driving apparatus according to the invention.

A main circuit 26 has the same configuration as in the first embodiment. In the fifth embodiment, a circuit-number calculation section 29 is provided before a phase calculation section 8, in a switching control section 26.

When a part of fault detection sections 24 of plural brake-chopper switching circuits 3 detects a fault of short-circuiting, a control section (unillustrated) of the electric-vehicle driving apparatus firstly separates a problematic brake-chopper switching circuit 3 causing the fault, by opening the open switch 17 connected to the problematic brake-chopper switching circuit 3, and keeps the remaining properly working brake-chopper switching circuits 3 operating. Therefore, the circuit-number calculation section 29 calculates a number N* of the properly working brake-chopper switching circuits 3, and outputs the number N* to the carrier phase calculation section 8. For example, the number of properly working circuits is calculated by an expression (5) below.

$$N^* = N - NF \quad (5)$$

In the above expression, N is a total number of brake-chopper switching circuits, and NF is a number of problematic brake-chopper switching circuits.

The phase calculation section 8 determines phases θBCH of triangular carrier waves as in the first embodiment, in accordance with the revised calculated number of brake-chopper switching circuits 3.

With the configuration described above, when a brake-chopper switching circuit 3 causes a fault of short-circuiting, the problematic brake-chopper switching circuit 3 can be separated by opening an open switch connected to the problematic brake-chopper switching circuit 3. The remaining properly working brake-chopper switching circuits 3 can be made continue operating. In addition, carrier phases of the properly working brake-chopper switching circuits 3 can be shifted in accordance with the number N* of the properly working circuits 3, and harmonic waves generated by the brake-chopper switching circuits 3 can be thereby reduced. Therefore, an electric-vehicle driving apparatus which ensures redundancy and performance can be provided.

Embodiment 6

FIG. 11 is a block diagram representing a schematic configuration of the sixth embodiment of an electric-vehicle driving apparatus according to the invention.

A main circuit 26 has the same configuration as that of the fifth embodiment in FIG. 10. In the sixth embodiment, a switching control section 26 is provided with a frequency calculation section 11 in place of a phase calculation section 8 in FIG. 10.

When a part of fault detection sections 24 of plural brake-chopper switching circuits 3 detects a fault of short-circuiting, a control section (unillustrated) of the electric-vehicle driving apparatus firstly separates a problematic brake-chopper switching circuit 3 causing the fault, by opening an open switch 17 connected to the problematic brake-chopper switching circuit 3, and keeps the remaining properly working brake-chopper switching circuits 3 operating. At this time, the circuit-number calculation section 29 calculates a number N* of the properly working brake-chopper switching circuits 3, as in the fifth embodiment, and outputs the number N* to a frequency calculation section 11.

The frequency calculation section 11 determines frequencies fBCH of triangular carrier waves in accordance with the number N* of properly working brake-chopper switching circuits 3, as in the second embodiment.

With the configuration described above, when a brake-chopper switching circuit 3 causes a fault of short-circuiting, the problematic brake-chopper switching circuit 3 can be separated by opening an opening switch. The remaining properly working brake-chopper switching circuits 3 can be made continue operating. In addition, carrier phases of the properly working brake-chopper switching circuits 3 are changed in accordance with the number N* of the properly working circuits 3, thereby to reduce harmonic waves generated by the brake-chopper switching circuits 3. Therefore, an electric-vehicle driving apparatus which ensures redundancy and performance can be provided.

Embodiment 7

Figure 12:
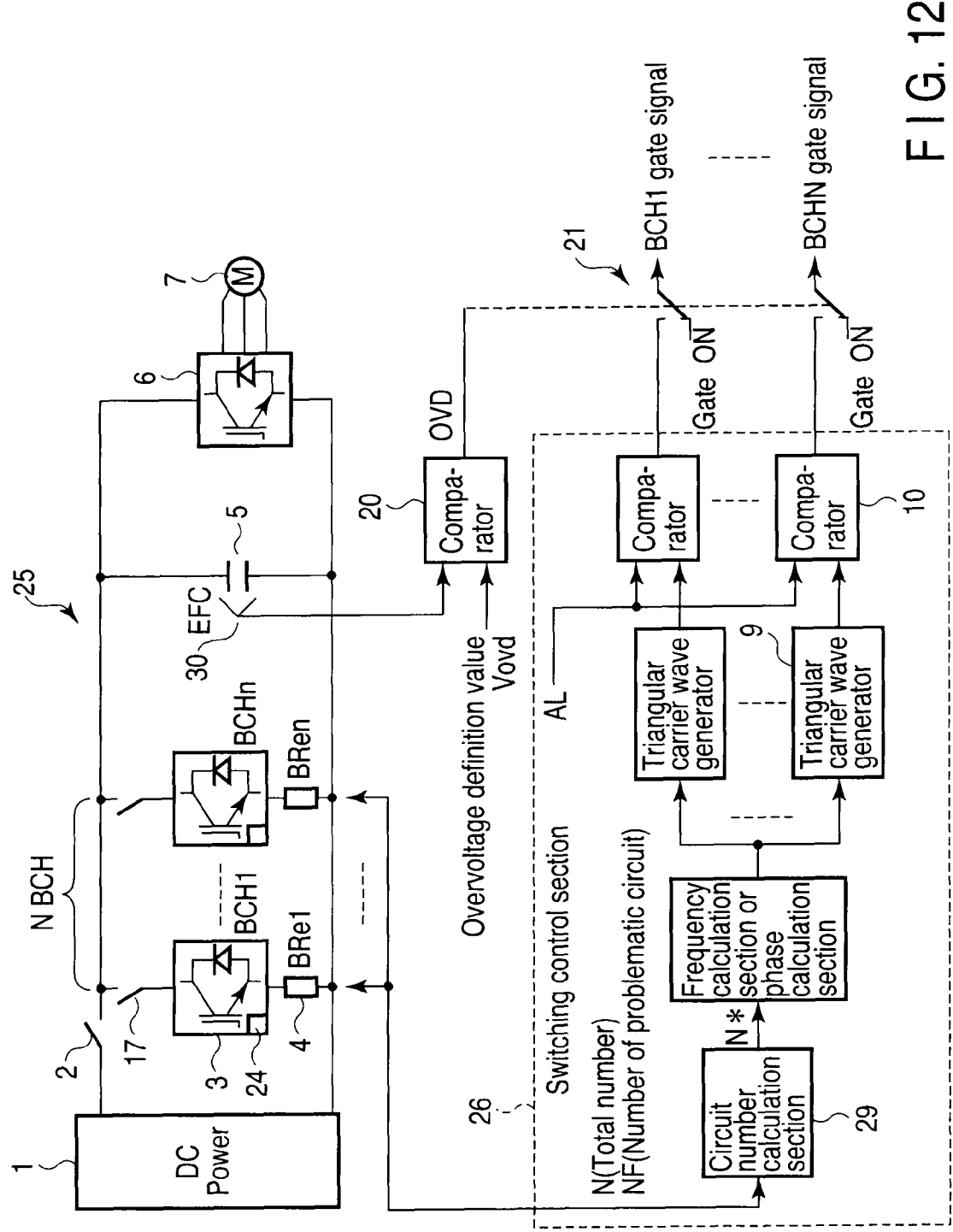
FIG. 12 is a block diagram representing a configuration of the seventh embodiment of the invention.

FIG. 12 is a block diagram representing a schematic configuration of the seventh embodiment of an electric-vehicle driving apparatus according to the invention.

In the seventh embodiment, there are provided a voltage detector 30 which detects a capacitor voltage EFC of a filter capacitor 5, a voltage comparator 20 which compares the capacitor voltage EFC with an overvoltage definition value Vovd, and a switch 21 which switches outputs of comparators 10 in accordance with a comparison result of the comparator 10.

The voltage comparator 20 determines whether the filter capacitor voltage is excessive or not by comparing the filter capacitor voltage EFC detected by the voltage detector 30 with the overvoltage definition value Vovd. If the filter capacitor voltage EFC exceeds the overvoltage definition value Vovd, an overvoltage signal OVD=1 is output.

When the overvoltage signal OVD=0, a switch 21 supplies outputs of the comparators 10 as gate signals of brake-chopper switching circuits 3, as in conventional cases. When the overvoltage signal OVD=1, the switch 21 maintains all gates of the brake-chopper switching circuits 3 switched on, independently from the outputs of the comparator 10.

With the configuration as described above, when a filter capacitor overvoltage occurs, gate signals for all the brake-chopper switching circuits 3 are changed to ON-continuation signals at once, and the filter capacitor overvoltage is discharged. Therefore, inverter devices can be prevented from being damaged by a filter capacitor overvoltage, and an electric-vehicle driving apparatus which ensures redundancy of the system can be provided.

Embodiment 8

Figure 13:
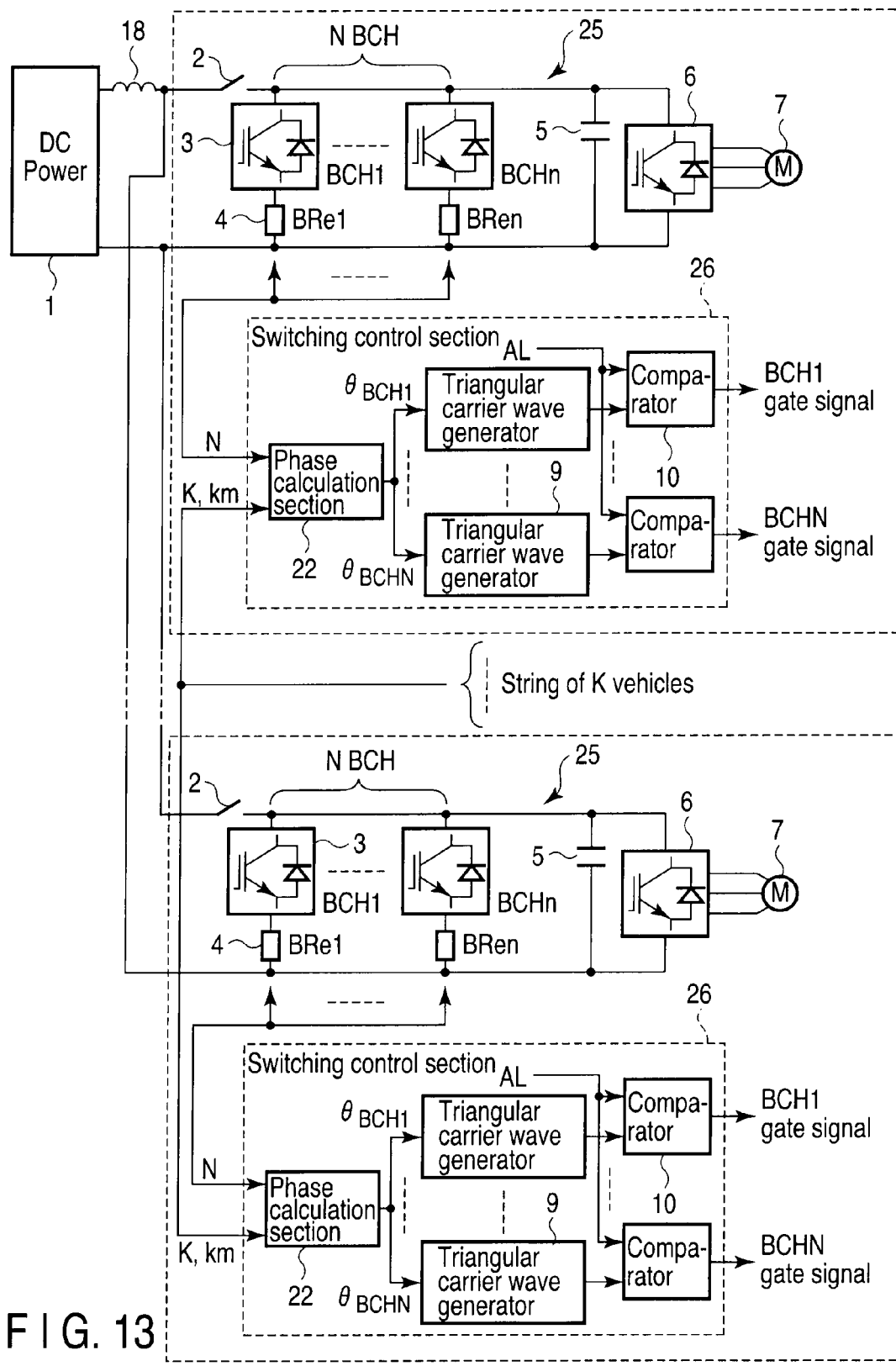
FIG. 13 is a block diagram representing a configuration of the eighth embodiment of the invention.
Figure 14:
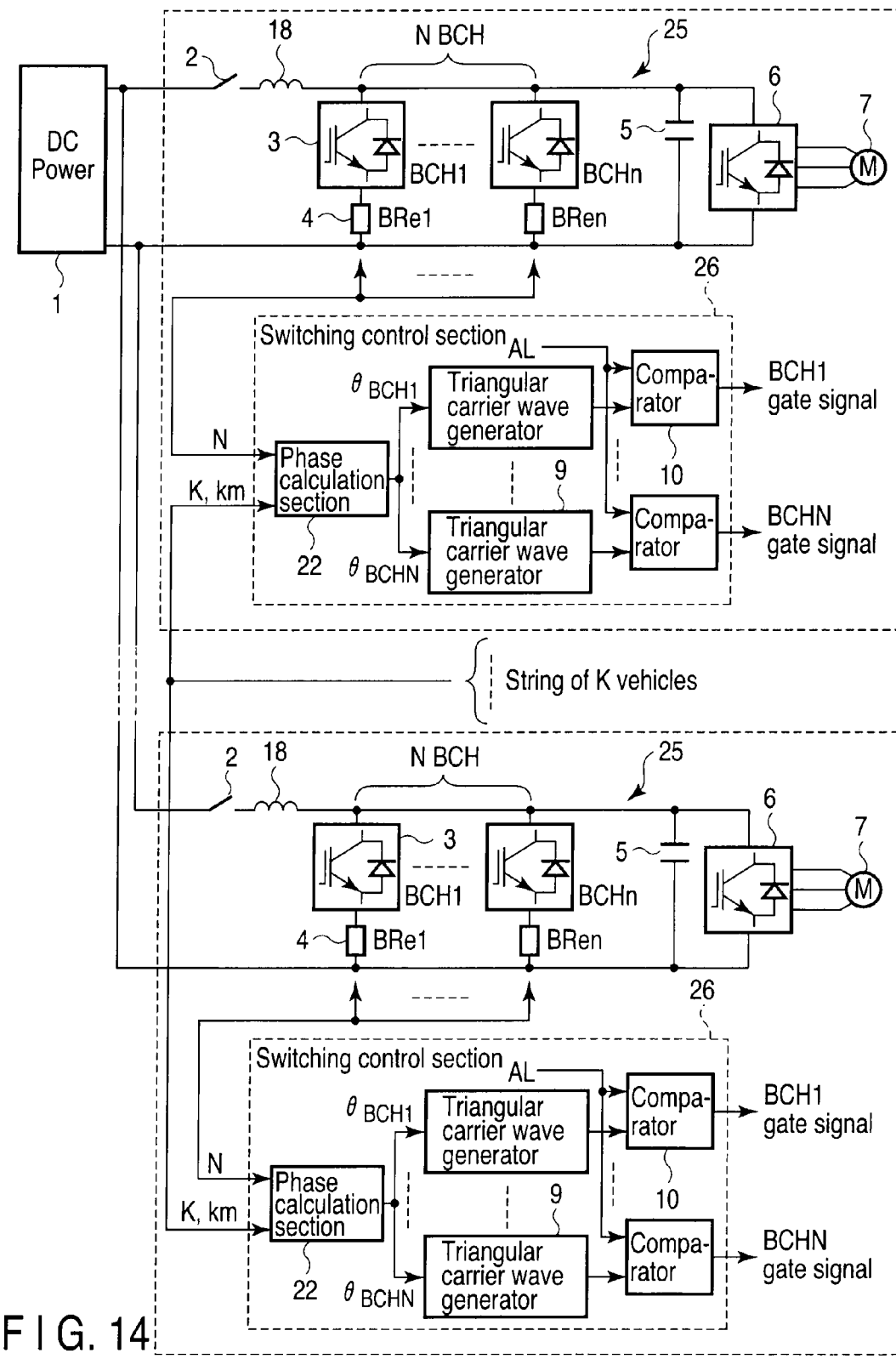
FIG. 14 is a block diagram representing another configuration of the eighth embodiment of the invention.
Figure 17:
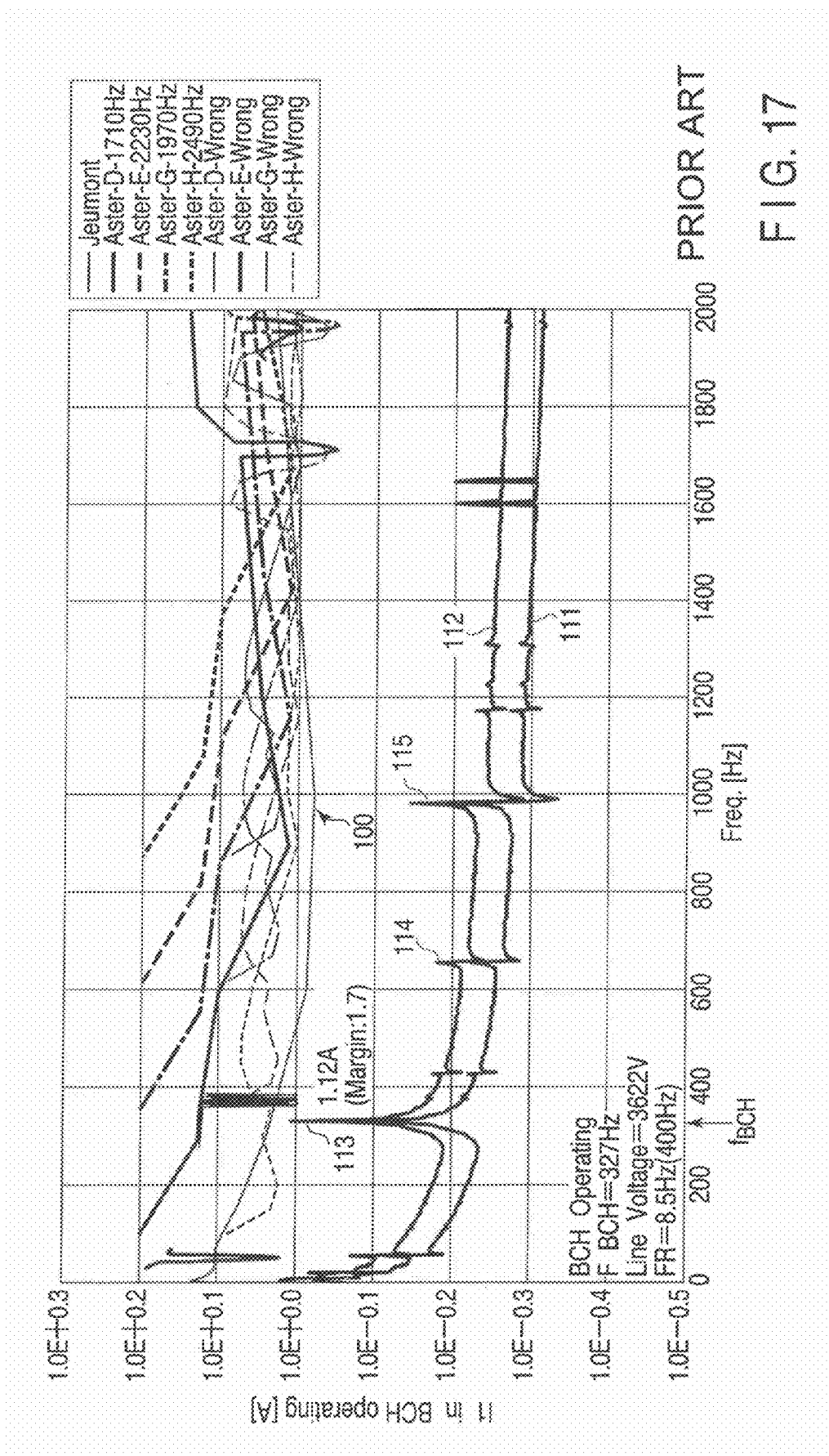
FIG. 17 is a graph showing simulation results of harmonic waves of a conventional brake-chopper switching circuit.

FIGS. 13 and 14 are block diagrams representing schematic configurations of the eighth embodiment of an electric-vehicle driving apparatus according to the invention.

In the eighth embodiment, K electric vehicle control devices each of which is the same as that in the first embodiment are connected in parallel to two ends of a DC power supply 1. Two configurations described below are provided in which reactors are respectively arranged in different layouts.

In a first configuration example, K DC power supplies connected in parallel are connected to an electric vehicle control device through one single reactor 18, as represented in FIG. 13. For example, the K electric vehicle control devices are connected in parallel to an intermediate link. The present embodiment is applied to a vehicle of a type in which plural (K) inverters are mounted on one single vehicle.

In a second configuration example, K electric vehicle control devices each of which comprises a reactor 18 are connected in parallel to a DC power supply 1, as represented in FIG. 14. This configuration example is applied to a case of operating a string of electric motor vehicles, or to a so-called electric train constituted by a string of two or more vehicles (wherein each of the vehicles is provide with an inverter circuit).

In the electric vehicle control devices configured as described above, a switching control section 26 in each of the electric vehicle control devices is input with a total number K and an location number Km of its own device or vehicle.

A phase calculation section 22 calculates phases of triangular carrier waves for brake-chopper switching circuits 3, in accordance with the total number K, the location number Km, and the number N of brake-chopper switching circuits, and outputs the phases to triangular carrier wave generators 9, respectively. For example, a phase θBCH of a triangular carrier wave is determined by an expression (6) below.

[Math 3]

$$\theta BCHn = \int (2*\pi*fBCH)dt + (n-1)*2\pi/N + (km-1)*2\pi/(K+N) \quad (6)$$

In the expression above, fBCH is a carrier frequency, N is the number of brake-chopper switching circuits 3 connected in parallel, n denotes an n-th brake-chopper switching circuit (where n=1 to N), K is a total number of power converters connected in parallel in an input side, and km denotes an m-th power converter (where m=1 to K).

With the configuration as described above, phases of triangular carrier waves for the respective brake-chopper switching circuits 3 are shifted from one another, in accordance with the number K of combined electric vehicle control devices and the number n of brake-chopper switching circuits 3. Therefore, amplitudes of frequency spectra of ripples of output currents from the brake-chopper switching circuits 3 could be decreased. In addition, harmonic waves which are generated by interference between harmonic components generated by the brake-chopper switching circuits 3 and by inverters could be more reduced. Therefore, performance of the electric-vehicle driving apparatus can be improved. Effects as described above can be achieved even when each of the main circuits 26 is configured to comprise a brake-chopper switching circuit 3 in the present embodiment.

Embodiment 9

FIGS. 15 and 16 are block diagrams representing schematic configurations of the ninth embodiment of an electric-vehicle driving apparatus according to the invention.

Each of main circuits 26 has the same configuration as that in the eighth embodiment.

As in the eighth embodiment, each electric vehicle control device is input with a total number K and an own location number Km in the ninth embodiment as well. A frequency calculation section 23 calculates frequencies of triangular carrier waves for brake-chopper switching circuits 3, in accordance with the total number K of electric vehicle control devices, the location number Km, and a number N of brake-chopper switching circuits. For example, a frequency fBCH of a triangular carrier wave is determined as expressed by an expression below.

$$fBCHn = f0 + (n-1)*\Delta f + (kn-1)*\Delta f' \quad (7)$$

In the expression above, $\Delta f$ and $\Delta f'$ are predetermined increases in carrier frequency, n denotes an n-th brake-chopper switching circuit 3 (where n=1 to N), N is a number of brake-chopper switching circuits 3 connected in parallel, and km denotes an m-th power converter (where m=1 to K).

Alternatively, predetermined frequencies may respectively be supplied to the brake-chopper switching circuits 3, as described below.

$$\text{If } (n = 1, km = 1), \quad fBCH = fBCH11$$

$$\text{If } (n = 2, km = 1), \quad fBCH = fBCH12$$

$$\ldots$$

$$\text{If } (n = N, km = 1), \quad fBCH = fBCH1N$$

$$\ldots$$

$$\text{If } (n = N, km = K), \quad fBCH = fBCHKN$$

In the expression above, fBCH11 to fBCHKN are predetermined values.

With the configuration as described above, triangular carrier wave frequencies of the respective brake-chopper switching circuits 3 are varied in correspondence with the number N of brake-chopper switching circuits 3. Therefore, frequency spectra of ripples of output currents from the brake-chopper switching circuits 3 are dispersed, to thereby decrease amplitudes of the ripples. In addition, harmonic waves which were generated by interference between harmonic components generated by the brake-chopper switching circuits 3 and by inverters could be reduced as well. Therefore, harmonic components generated by the brake-chopper switching circuits 3 can be suppressed, and performance of the electric-vehicle driving apparatus can be improved. As in the foregoing eighth embodiment, effects as described above can be achieved even when each of the main circuits 26 is configured to comprise only one brake-chopper switching circuit 3 in the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric-vehicle driving apparatus comprising:

an electric power converter which is connected to a DC power supply and converts a DC power into a three-phase current power at a variable frequency/voltage, to drive an AC motor;

a plurality of power-generation brake circuits each of which is connected in parallel to terminals of the electric power converter in a DC side thereof and is constituted by a serial circuit comprising a switching circuit and a resistor, to control consumption of regenerative electric power; and a switching control section which controls switching of the switching circuits by gate signals generated on the basis of comparison between carrier frequency waves generated for the respective switching circuits and a conduction ratio, wherein the switching control section generates the gate signals by shifting said carrier frequency waves of the respective switching circuits.

2. The electric-vehicle driving apparatus of claim 1, wherein the switching control section generates said carrier frequency waves at frequencies different from each other respectively for the switching circuits.

3. The electric-vehicle driving apparatus of claim 2, wherein the switching control section separates problematic one of the plurality of switching circuits, and controls the switching circuits by using triangle waves having a phase difference between each other in accordance with a number of remaining properly working ones of the plurality of switching circuits.

4. The electric-vehicle driving apparatus of claim 1, wherein the switching control section separates problematic one of the plurality of switching circuits, and controls the switching circuits by using triangle waves having a phase difference between each other in accordance with a number of remaining properly working ones of the plurality of switching circuits.

5. An electric-vehicle driving apparatus comprising the electric-vehicle driving apparatus of claim 1, which is provided in a plurality, the plurality of the electric-vehicle driving apparatuses being connected in parallel to a DC power supply, wherein said carrier frequency waves having phases which are different from each other are generated respectively for the plurality of switching circuits include in the plurality of the electric-vehicle driving apparatuses.

6. An electric-vehicle driving apparatus comprising:

an electric power converter which is connected to a DC power supply and converts a DC power into a three-phase current power at a variable frequency/voltage, to drive an AC motor;

a power-generation brake circuit which is connected in parallel to terminals of the electric power converter in a DC side thereof and is constituted by a serial circuit comprising a switching circuit and a resistor, to control consumption of regenerative electric power; and a switching control section which controls switching of the switching circuit by a gate signal generated on the basis of comparison between a carrier frequency wave generated for the switching circuit and a conduction ratio, wherein the switching control section changes a frequency of the carrier frequency wave as time passes.

* * * * *